United States Patent [19]

Clausen et al.

[11] Patent Number: 4,580,185
[45] Date of Patent: Apr. 1, 1986

[54] VIDEO PLAYER/RECORDER CLEANING APPARATUS AND METHOD

[75] Inventors: Eivind Clausen; James D. Allsop, both of Bellingham, Wash.

[73] Assignee: Allsop, Inc., Bellingham, Wash.

[21] Appl. No.: 581,264

[22] Filed: Feb. 17, 1984

Related U.S. Application Data

[63] Continuation of Ser. No. 339,831, Jan. 15, 1982, abandoned, which is a continuation of Ser. No. 109,650, Jan. 4, 1980, abandoned.

[51] Int. Cl.$^4$ .............................................. G11B 5/41
[52] U.S. Cl. ...................................... 360/128; 360/137
[58] Field of Search ................................. 360/128, 137

[56] References Cited

U.S. PATENT DOCUMENTS

| 3,931,643 | 1/1976 | Kuroe | 360/128 |
| 3,964,104 | 6/1976 | Herron et al. | 360/128 |
| 4,122,506 | 10/1978 | Kubo et al. | 360/95 X |
| 4,141,053 | 2/1979 | Kara | 360/128 |

FOREIGN PATENT DOCUMENTS

| 52-75426 | 6/1977 | Japan | 360/128 |

*Primary Examiner*—John H. Wolff
*Attorney, Agent, or Firm*—Hughes & Cassidy

[57] ABSTRACT

A cassette case adapted to be placed in the cassette recess of a video player/recorder. A cleaning ribbon is mounted in the case and is moved outwardly by tape-guides of the player/recorder to engage the video head and audio head of the player/recorder. To cause the cleaning ribbon to retract after the cleaning operation, there is provided a shut-off ribbon, operated by the drive spindle of the player/recorder, with the shut-off ribbon cooperating with the light/photocell already in the player/recorder. A tension ribbon is connected to the cleaning ribbon to move the cleaning ribbon out of engagement with the video playing/recording head and audio head to its retracted position.

29 Claims, 12 Drawing Figures

VIDEO PLAYER/RECORDER CLEANING APPARATUS AND METHOD

This is a continuation of application Ser. No. 339,831, filed Jan. 15, 1982, which is a continuation of Ser. No. 109,650, filed Jan. 4, 1980, both now abandoned.

BACKGROUND OF THE INVENTION

The present invention relates to a method and apparatus for cleaning operating components of a video player/recorder.

In recent years, video player/recorders have become very popular. Typically, there is a video head which either records or plays back the video portion of a playing tape, and an audio head which performs the same function for the sound portion of the tape. For proper operation of the player/recorder, it is desirable that the surface portions of the components that contact the playing tape be cleaned periodically.

Particularly for cassette player/recorders, this cleaning operation can be rather difficult. In a typical cassette player/recorder, there is a rectangular cassette recess into which the cassette containing the playing tape is placed. The video head and the audio head of the machine are positioned within the housing of the player/recorder, and are spaced a moderate distance away from the open cassette recess. When the player/recorder is operated, a number of guides that are part of the player/recorder apparatus engage the tape in the cassette case and move the tape outwardly into engagement with the playing/recording heads. The locations of these heads are sufficiently inaccessible so that cleaning the heads by means of some manually operated instrument is at best a clumsy operation.

Another problem is that the video playing/recording head is a delicate component which should be handled with a high degree of care. A typical video head is in the shape of a disc having a circumferential operating surface which engages the surface of the playing tape. On the peripheral surface of the video head, there is at least one (and in some instances a plurality) of scanning elements. The video head is mounted for rotation about a circular path that is slightly angled or canted with respect to the longitudinal axis of the playing tape. In operation, the video head is rotated at a very high rate, in the order of one to two thousand revolutions per minute, with the elements scanning the tape on each revolution. In bringing any sort of cleaning device into contact with the video head, extreme caution should be exercised in avoiding any damage to the operating elements of the video head. Also, with the video head rotating at such high speed, the torque of the drive for the video head is necessarily small, so that care should be exercised in not creating any substantial amount of frictional resistance against the peripheral surface of the head, since it is possible that such resistance would substantially reduce the rate of rotation and possibly damage some of the operating components.

A search of the patent literature disclosed a number of U.S. patents, these being discussed below.

U.S. Pat. No. 3,647,990, Eul Jr. et al, discloses a cleaning and demagnetizing device where there is a cleaning tape rotatably mounted about a spindle. A demagnetizing element is gradually moved away from the playing head by a reduction in diameter of the winding of the cleaning tape.

U.S. Pat. No. 3,671,994, Becht, shows a manually operated lever which can be moved back and forth to clean the head of a magnetic tape recording/playing unit. This lever is mounted in a cartridge which is placed in the aperture or recess of the unit.

U.S. Pat. No. 3,955,214, Post, shows a cassette housing containing a device to clean the playing head of a magnetic tape recorder/playing unit. There is a cam member rotatably mounted so as to be driven by one of the drive spindles of the unit. The cam member causes back and forth motion of an operating lever, which in turn causes a cleaning element to move back and forth across the playing/recording head.

U.S. Pat. No. 4,141,053, Kara, discloses a cassette-type cleaner for a magnetic tape recording/playback unit. In operation, the capstan of the unit engages a rubber pad which starts rotation of a gear-train which rotates a cleaning member that is in contact with the playing/recording head.

U.S. Pat. No. 4,149,206, Loiselle, discloses a device for cleaning the head of a magnetic tape recorder/playing unit, where there is a lever arm which moves a cleaning element back and forth across the head. There is an eccentrically mounted circular cam which is driven by one of the spindles of the unit to cause back and forth movement of the lever.

In view of the foregoing, it is an object of the present invention to provide a method and apparatus which can effectively and reliably clean the operating components of a video player/recorder.

SUMMARY OF THE INVENTION

The present invention is adapted to be used in conjunction with a playing and/or recording apparatus comprising a head member and guide means. The head member has a head surface which is subject to contamination, and the guide means is moveable between a first retracted position and an extended operating position to move a tape into operating engagement with the head member. The present invention is a device to clean the head surface. This device comprises a housing adapted to be mounted in an operating position relative to the apparatus. In the preferred form, this housing has the same configuration as a conventional tape cassette that is mounted in a recess of the apparatus.

The device further comprises a cleaning member mounted and arranged relative to the housing so that with the housing in its operating position, the cleaning member is positioned between the head member and the guide means. The cleaning member is arranged so that with the guide means moving to its operating position, the guide means moves the cleaning member to an operating position in cleaning engagement with the head surface.

Desirably, there is retracting means adapted to be operatively connected to a drive member of the apparatus. Movement of the drive member causes a retracting means to move the cleaning member from its operating position back to its retracted position.

Desirably the cleaning member is a flexible cleaning member having a cleaning surface and two side portions on opposite sides of the cleaning surface. The cleaning member is so arranged that when it is in cleaning engagement with the head surface, the side portions are positioned at spaced locations on opposite sides of a portion of the head surface, with the cleaning surface being deflected in an angled position against the head surface portion. Preferably, the cleaning member is resiliently deflected to its curved position, this being accomplished by applying a tension force along a lengthwise axis of the cleaning member.

In the specific embodiment shown herein, the head member is rotatably mounted so that it travels a closed rotational path. The cleaning member in its operating position is located in a curved location along the rotational path. Specifically, this is a circular path.

In the form shown herein, the playing and/or recording apparatus has at least one drive member adapted to cause movement of the tape during operation of the apparatus. Desirably the retracting means is operatively connected to the drive member, with movement of the drive member causing said retracting means to move the cleaning member from its operating position back to its retracted position. Preferably, spring means is operatively connected to the retracting member so as to impose the resilient tension load on the retracting member.

Also, in the specific form shown herein, there is a shut-off member moveable on a path between an operating position and a shut-off position. The shut-off member is adapted to be operatively connected to a drive member of the apparatus in a manner that movement of the drive member during operation of the apparatus causes the shut-off member to move from an operating position to its shut-off position during a cleaning cycle of the device, so as to shut-off operation of the drive member and to cause the guide means to be retracted. Specifically, the shut-off member comprises an endless belt mounted to the drive member, the belt having a shut-off portion thereon. The belt moves on a closed path to cause the shut-off portion to the shut-off position. In the embodiment shown herein, the belt comprises a light transmitting portion and a light interrupting portion. The belt is positioned so as to be moveable relative to the light source to cause transmission and interruption of light to accomplish the shut-off operation.

As shown herein, there are two head members to be cleaned by the device. First, there is a rotating head member which rotates in cleaning contact with the cleaning member. Second, there is a stationary head member which is cleaned by the cleaning member wiping against its cleaning surface as it moves from its retracted to its extended operating position.

In the method of the present invention, the cleaning member is positioned in the housing in a retracted position. Then the guide means is moved to its operating position so as to move the cleaning member to an operating position in cleaning engagement with the head surface.

Other features will become apparent from the following detailed description.

DESCRIPTION OF THE PREFERRED EMBODIMENT

As indicated previously, the present invention is particularly adapted to clean the operating components of a video recording/playing unit which is adapted to accept cassette-type playing tapes. Accordingly, it is believed that a clearer understanding of the present invention will be obtained by first describing the operating components of a conventional video playing-/recording unit. In the following description, the video playing/recording unit 10 will be referred to as "the video unit" or simply as "the unit".

Figure 1:
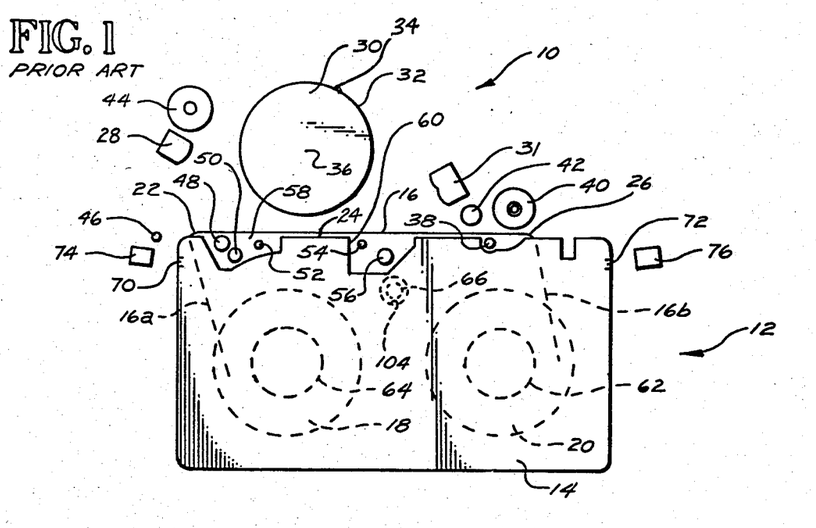
FIG. 1 is a semi-schematic top plan view showing certain operating components of a typical playing-/recording apparatus, with a tape cassette mounted in its playing position relative to the apparatus.
Figure 2:
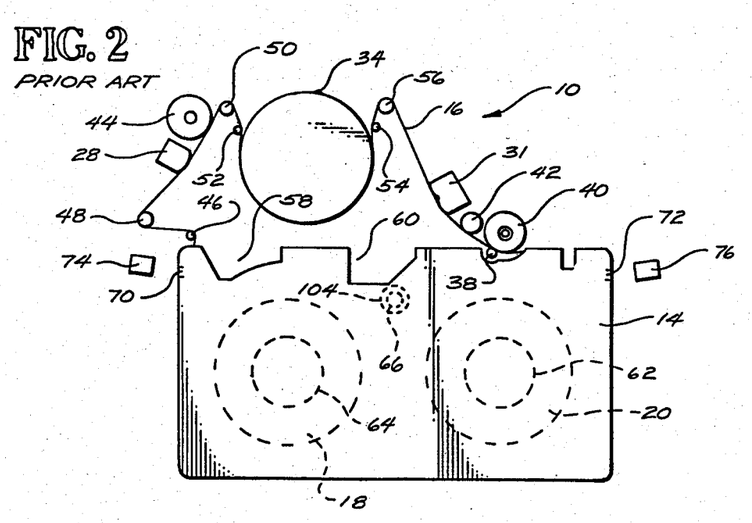
FIG. 2 is a view similar to FIG. 1 showing the tape of the cassette in its playing or recording position.

In FIGS. 1 and 2, some of the main operating components of the video unit 10 are shown in plan view, with a tape cassette 12 also being shown in plan view in its operating position in the video unit. In the illustrations of FIGS. 1 and 2, the housing, circuit component, operating knobs and certain other components of the video unit 10 are not shown, since these are not required for an understanding of the present invention. Rather, there are shown only those operating components which directly engage the playing tape or which actuate the shut-off and reversing mechanism of the unit 10.

This tape cassette 12 comprises a case or housing 14, and a magnetic tape 16. The case 14 has a generally rectangular configuration and fits in a matching rectangular recess in the video unit 10. (For convenience of illustration the recess for the case 14 is not shown). The tape 16 is wound on left and right spools 18 and 20, the tape extending from one spool 18 to a location 22 at the front left corner of the case 14, thence along the front edge 24 of the case 12 to a right front location 26, and thence back to the right spool 20. In FIG. 1, the tape 16 is shown in its non-playing or retracted position, and in FIG. 2 in its operating position.

To describe the operating components of the video unit 10, there are three magnetic operating components which either respond to the magnetic signals on the tape 16, affect the magnetic signals on the tape 16, or do both. These magnetic operating components are: an erase head 28, a video head 30, and an audio head 31. As its name implies, the erase head 28 can be operated to cause erasure of the magnetic signals on the tape 16. The video head 30 can operate either as a playback head or a recording head. The video head 30 has the general configuration of a circular disc (i.e. a shallow cylinder), and has a peripheral cylindrically shaped operating surface 32. On the peripheral surface 32 there are one or more scanning elements 34, and the head 30 rotates about the center axis 36 of the cylindrical surface 32. The head 30 is slanted moderately from the horizontal so that the center axis 36 is canted or angled moderately from a line perpendicular to the plane of the tape cassette 12. Thus, as the video head rotates about its axis 36, the scanning element or elements 34 move across the tape 16 in a diagonal line relative to the lengthwise axis of the tape 16.

The audio head 31 operates on the audio portion of the tape 16 to either play back audio signals on the tape 16 (in the playing mode) or to record audio signals on the tape 16 when the unit is in its recording mode. Also the audio head 31 can in some instances perform an erasing function.

The video unit 10 also comprises a number of mechanical components which operate directly on the tape 16 to properly position the tape 16 in the operating mode, and also to move the tape 16 along its operating path. First, there is a capstan 38 and a pinch roller 40. There is a first stationary guide roller 42 positioned approximately midway between the capstan 38 and audio head 31, and a second stationery guide roller 44 positioned adjacent the erase head 28.

Finally, there are six movable guide members designated 46 through 56, respectively. The guide member 46 is positioned adjacent the left front corner of the cassette case 14, and in its operating position moves toward the right to engage the tape 16 as it moves from the left front portion of the case 14. The three guide members 48, 50 and 52 are in their non-operating positions located in a recess 58 at the left front portion of the case 14. In the operating position, shown in FIG. 2, the three guide members 48, 50 and 52 engage the back side of the tape 16 and move it outwardly to guide the tape 16 on a path across the erase head 28, and thence rearwardly along the left portion of the video head 30. The remaining two guide members 54 and 56 are in the non-operating position (shown in FIG. 1) located in a second recess 60 at the front middle portion of the case 14. In the operating position, the two guide members 54 and 56 move generally forwardly to the position shown in FIG. 2, to cause the tape 16 to track approximately 180° around the circumference of the video head 30, and thence across the audio head 31 to a location between the capstan 38 and pinch roller 40.

There is a first drive sprocket 62 which fits into the center portion of the right spool 20 in a spline fitting so that it is able to drive the spool 20. There is a second take-up sprocket 64 which fits through the center of the left spool 18 in a spline fit. When the tape cassette 12 is initially placed in the unit 10, and the unit 10 is in its non-operating condition, the operating components are in the position shown in FIG. 1, and the tape 16 extends in a straight line along the front edge of the case 14. When the unit 16 is placed in an operating mode (either the recording mode, playback mode, or erase mode), several things occur nearly simultaneously. First, the three guide members 48, 50 and 52 engage the left forward portion of the tape 16 to move it outwardly between the erase head 28 and the video head 30, and the guide member 46 moves to the right to engage the tape 16. Second, as indicated previously, the two guide members 54 and 56 move the middle portion of the tape 16 outwardly to a location between the video head 30 and audio head 31. Third, the pinch roller 40 moves rearwardly to press the right hand portion of the tape 16 against the capstan 30. Fourth, the drive sprocket 62 rotates the sprocket 20 clockwise to cause the tape 16 to be wound thereon. At the same time, the second sprocket 64 rotates freely to permit the tape 16 to be wound therefrom.

There is a shut-off light 66 which fits in a matching recess 68 formed in the forward middle portion of the bottom wall of the case 14, located just rearwardly of the front middle recess 60. At the forward portions of the left and right edges of the case 14, there are through openings, 70 and 72 respectively. The video unit 10 has a left photocell 74 positioned adjacent the left side of the case 14 and in alignment with the light 66 and the left opening 70. In some instances there may be a right photocell 76 positioned adjacent the right side of the case 14 and in alignment with the light 66 and right opening 72. That portion of the tape 16 (designated 16a) which extends from the left spool 18 to the front left corner 22 passes between the opening 70 and the light 66. In like manner, that portion of the tape 16 (designated 16b) which extends between the right spool 20 and the forward right tape portion 26 passes between the light 26 and the right opening 72. The tape 16 is opaque throughout its entire length, except for the extreme end portions of the tape 16 which are made transparent. Thus, during most of the operation, the photocell 74 (and the photocell 76 if it exists) is shielded by the tape portion 16a and 16b respectively from the light 66.

When the tape 16 is moving from left to right (in either the playing or recording mode), the tape is being wound onto the spool 20. When the tape 16 has become nearly entirely wound on the spool 20, the left transparent portion of the tape at 16a moves past the opening 70, thus permitting the light 66 to activate the photocell 74. This signals the video unit 10 that the tape 16 has completed its left to right path of travel and signals the video unit 10 to shut off. The video unit 10 responds by causing the six movable guide components 46 through 56 to move to their retracted position (shown in FIG. 1), also signals the sprocket 62 to cease rotating, and for the left sprocket 64 to begin rotating counter-clockwise to take up the slack in the tape 16. When the slack in the tape 16 is taken up, the tape 16 exerts a resisting force on the sprocket 64 to cause it to stop rotating, and the machine totally shuts off. When the tape 16 completes its rewinding cycle onto the spool 18 by pressing the rewind button, the transparent tape portion at the opposite end of the tape 16 passes by the opening 70, thus permitting the light 66 to activate the photocell 74. This signals the video unit 10 that the rewind operation is complete and the sprocket 64 stops rotating.

It is to be understood that the video player 10 and tape cassette 12, described above, already exist in the prior art. Also, the mode of operation of the unit 10 and tape cassette 12, as described above, already exist in the prior art. With the foregoing description providing background information, the present invention will now be described.

Figure 3:
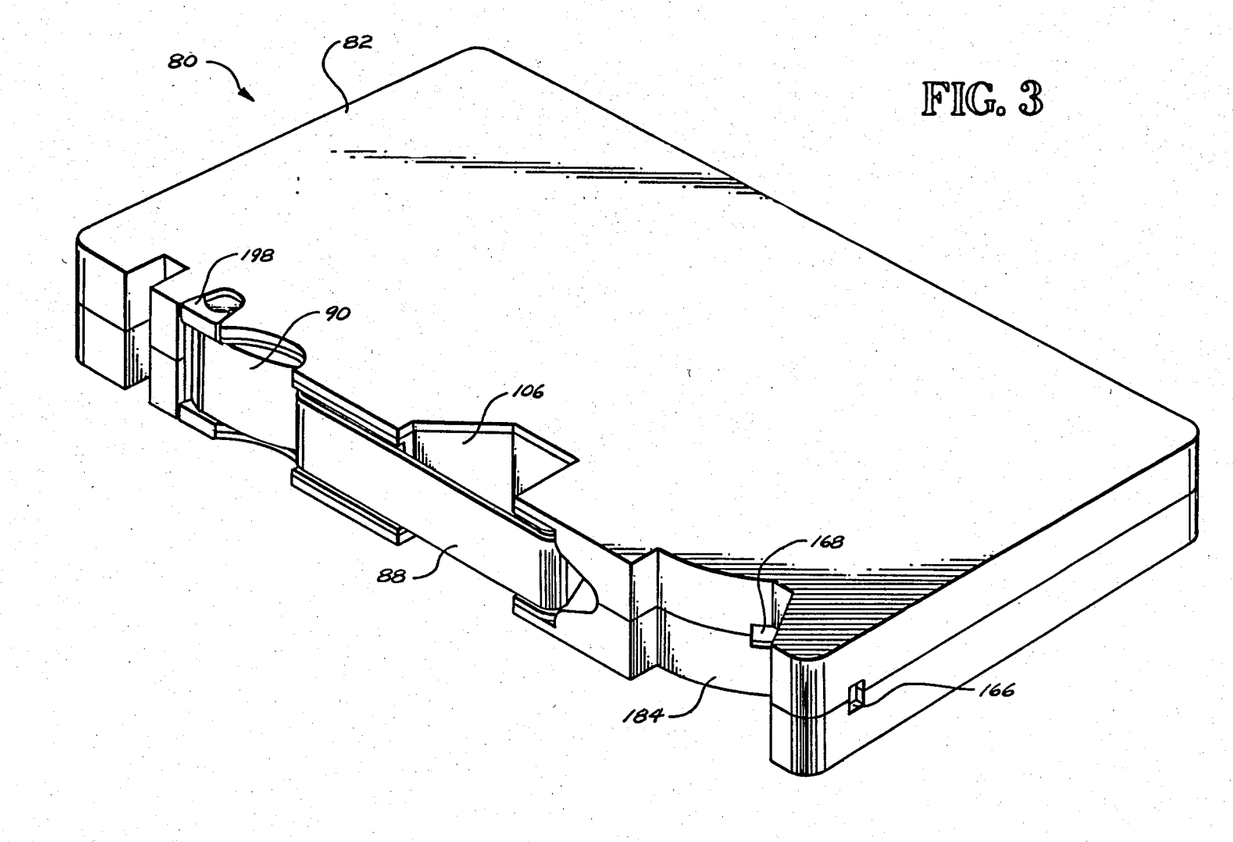
FIG. 3 is an isometric view of the cleaning device of the present invention.

The cleaning device of the present invention is generally designated 80, and comprises a case 82 in which is mounted a cleaning cartridge 84. The case 82 with the cleaning cartridge 84 inserted therein is shown in perspective in FIG. 3, and it can be seen that the overall configuration of the cleaning device 80 is substantially the same as a conventional tape cassette, such as that shown at 12 in FIGS. 1 and 2. Thus, the device 80 can readily be inserted in the video unit recess that normally accommodates the tape cassette 12 as illustrated in FIGS. 1 and 2.

Figure 9:
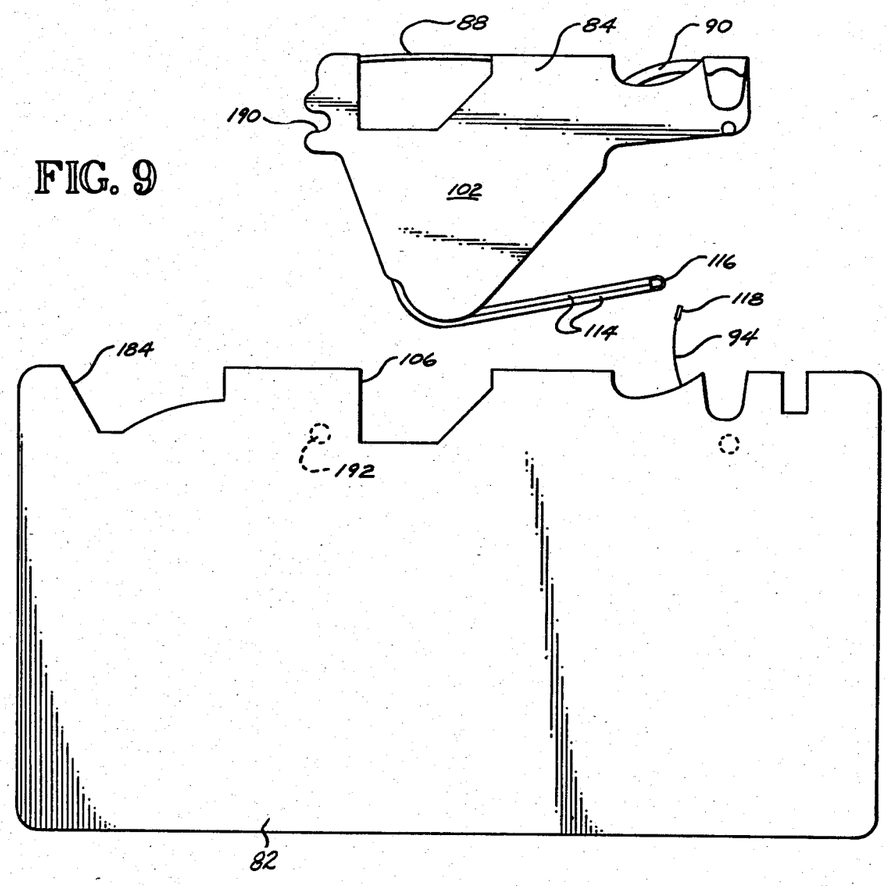
FIGS. 9, 10 and 11 illustrate the manner in which a cartridge holding the cleaning components of the present invention can be inserted into the housing of the present invention.

The cleaning cartridge 84 can best be seen as a component, separate from the case 82, in FIG. 9. The main components of the cartridge 84 are a housing 86, a cleaning ribbon 88, and a cleaning pad 90. (See FIGS. 4 and 5.) The main function of the cleaning ribbon 88 is to move outwardly from the case 82 and cartridge 84 to engage the video head 30 and the audio head 31 so as to clean the operating surfaces of the these components 30 and 31. The function of the cleaning pad 90 is to engage and clean the capstan 38 and pinch roller 40. During operation, the capstan 38 and pinch roller 40 rotate against the pad 90 to cause cleaning of the capstan 38 and pinch roller 40 surfaces that engage the tape 16.

The case 82, in addition to containing the cartridge 84, holds two main operating components. First, there is a tension and return device 92 having as its main operating component a tension ribbon 94 which attaches to the cleaning ribbon 88. The tension ribbon 94 has two functions. First, during the cleaning operation of the cleaning ribbon 88, the tension ribbon 94 exerts the proper tension force on the cleaning ribbon 88 to enable it to properly engage the video head 30 and audio head 31. Second, at the completion of the cleaning cycle, the tension ribbon 94 retracts the cleaning ribbon 88 into the device 80.

Second, there is a shut-off device 96 which, as its name implies, operates to stop operation of the video unit 10 after a predetermined cleaning period, and thus complete the cleaning cycle of the device 80. The manner in which this is accomplished will be described more fully hereinafter, but it can be indicated briefly at this time that the shut-off ribbon 98 is rotated in an endless path by means of the right drive sprocket 62 in a manner to actuate the left photocell 74 at the proper time.

Figure 4:
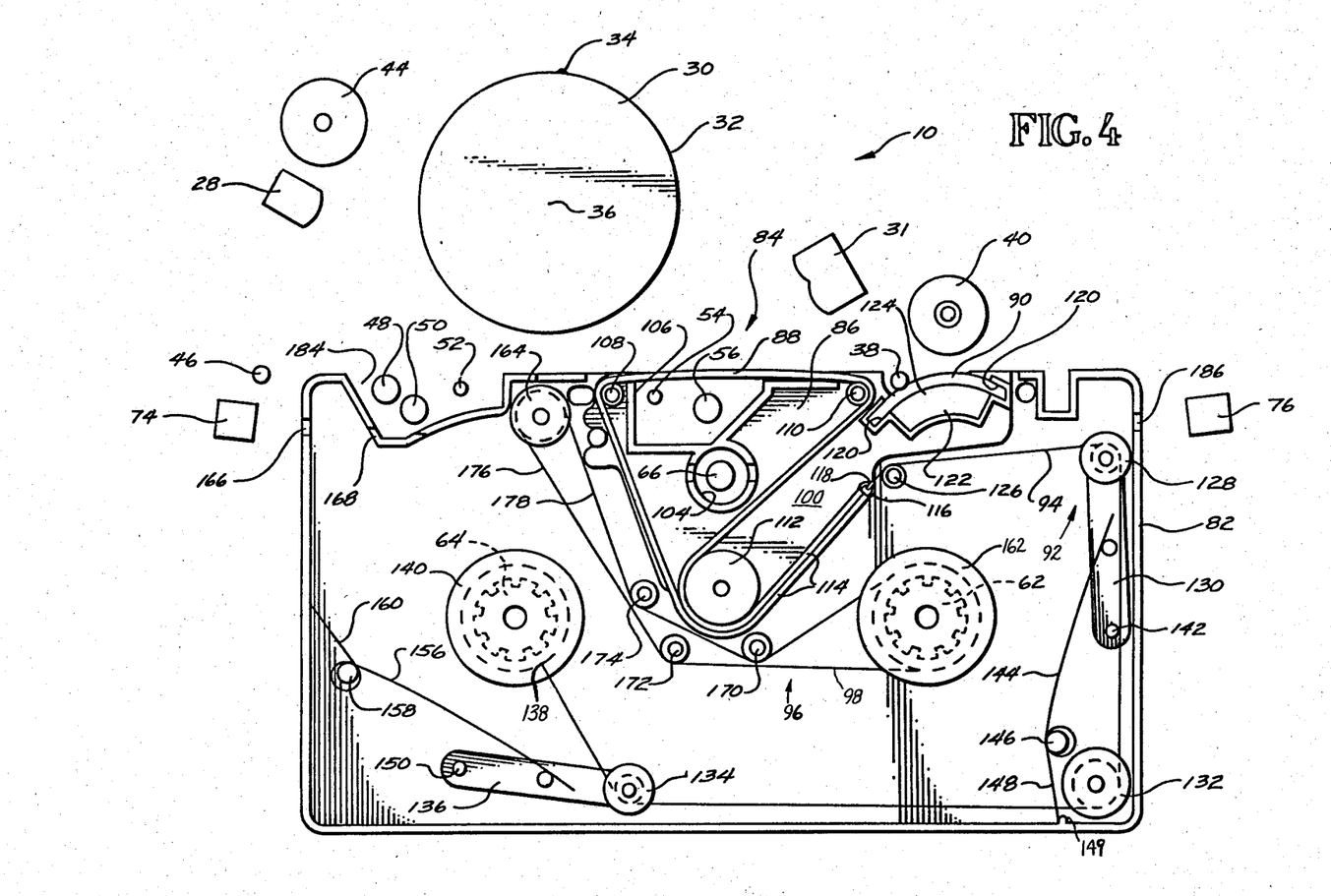
FIG. 4 is a top plan view, showing the cover of the cleaning device removed, and with the cleaning device in its retracted position relative to the playing/recording apparatus.
Figure 5:
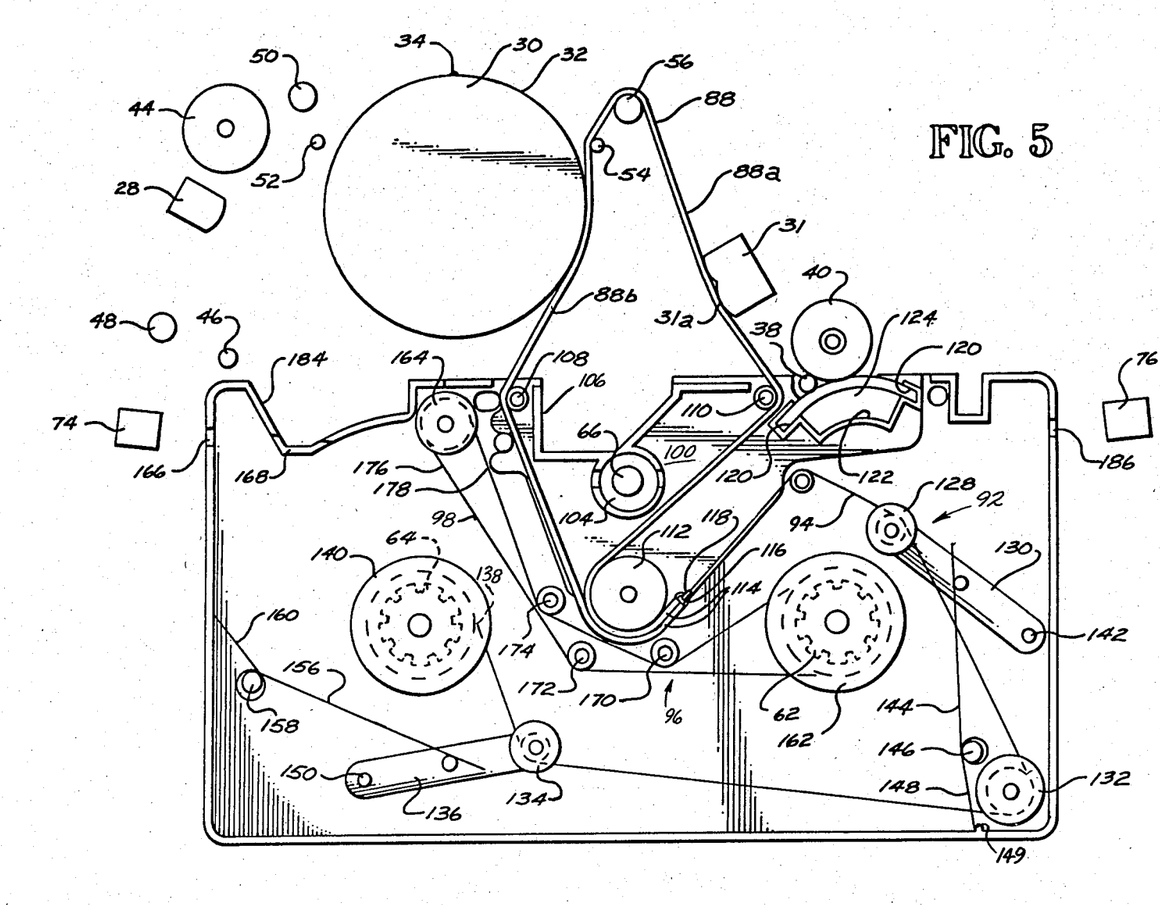
FIG. 5 is a view similar to FIG. 4, showing the cleaning elements of the present invention in their operating position and cleaning engagement with the two cleaning heads.
Figure 10:
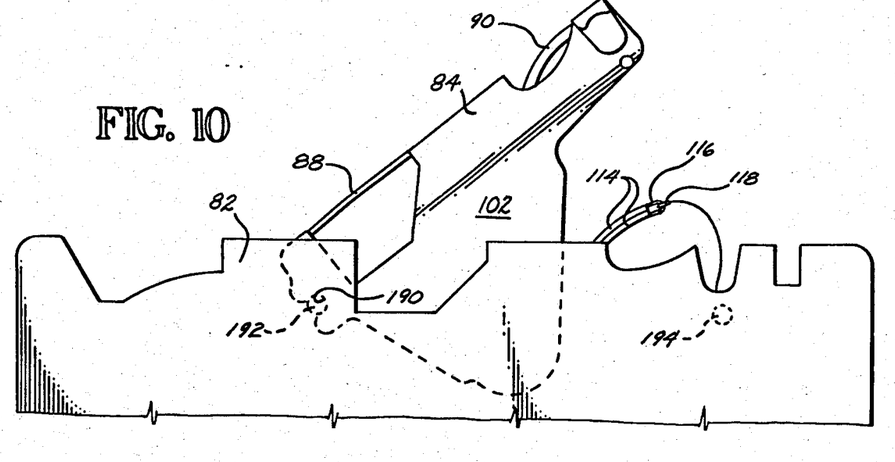

To describe the cleaning cartridge 84 in more detail, reference is made to FIGS. 4 and 5. The cartridge housing 86 has a bottom wall 100 (shown in FIGS. 4 and 5), and a top wall 102 (shown in FIGS. 9 and 10). The bottom wall 100 has an opening 104 to receive the light 66 already existing in the video unit 10. The housing 86 has a forward recess 106 having the same general configuration as the forward middle recess 60 of the tape cassette 12 of FIGS. 1 and 2, to accommodate the two guide members 54 and 56 of the video unit 10. At the forward portion of the cartridge housing 86, there are left and right stationery guide rollers 108 and 110, respectively, positioned on opposite sides of the recess 106. There is a guide roller 112 rotatably mounted in the rear part of the cartridge housing 86 so as to be approximately centrally located in the device 80.

The cleaning ribbon 88 is made of a material suitable for cleaning, such as a synthetic chamois material. The two end portions 114 of the cleaning ribbon 88 are joined together to form a loop, with the cleaning ribbon 88 extending around both of the forward guide members 108 and 110, with the cleaning ribbon 88 doubling over on itself and extending around the left and bottom portion of the lower roller 112. At the end portion 114 of the ribbon 88, there is a small wire loop 116 which attaches to a hook 118 secured to the end of the tension ribbon 94.

The cleaning pad 90 is mounted at the front right portion of the cartridge 84, with end portions of the pad 90 fitting with a friction fit into two oppositely positioned recesses 120. The cartridge housing 86 is also formed with a larger recess 122 rearwardly of and immediately behind the recesses 120 to accommodate a compressible foam piece 124. With the pad 90 secured in the two side recesses 120, the foam piece 124 pushes outwardly against the pad 90 to cause it to deflect in a forward curve toward the location of the capstan 38 and pinch roller 40.

To describe now in detail the tension and return unit 92, the tension ribbon 94 is, as indicated previously, connected by an end hook 118 to the loop 116 at the end portions 114 of the cleaning ribbon 88. From that connecting location, the tension ribbon 94 extends around a first guide roller 126 then around a guide roller 128 mounted on a spring arm 130 positioned at the right side of the case 82, then around a guide roller 132 at the rear right corner, thence along the rear of the case 82 to a third guide roller 134 mounted to a second spring arm 136, and thence to an end location where the opposite end 138 of the tension ribbon 94 connects to a spool 140 that is splined to the drive sprocket 64.

The first spring arm 130 is pivoted at 142 and is urged by a spring 144 to the right so as to tend to pull the end portions 114 of the cleaning ribbon 88 toward its retracted position. The spring member 144 coils around a locating pin 146 and has an anchor end 148 bearing against a rib 149 at the near part of the housing 82. The second spring arm 136 is pivotally mounted at 150, and urged by a spring 156 to a rearward location to act in the same manner as the spring arm 130 to create tension on the ribbon 94. The spring 156 is looped around a locating pin 158, and has an anchor end 160 bearing against the left wall of the case 82.

To indicate at this time the function of the tension ribbon 94, with the cleaning device 80 in its non-operating position, the two spring arms 130 and 136 create sufficient tension on the ribbon 94 to hold the cleaning ribbon 88 in its retracted position, as shown in FIG. 4. When the cleaning ribbon 88 is moved outwardly to its operating position, shown in FIG. 5, the two spring arms 130 and 136 provide moderate resistance against the extension of the cleaning ribbon 88 so that it will engage the video head 30 and the audio head 31 with only moderate pressure. At the completion of the cleaning cycle, the left drive sprocket 64 begins to rotate in a counter-clockwise direction to pull the tension ribbon 94 so as to move the end portions 114 of the cleaning ribbon 88 toward the retracted position and thus move the ribbon 88 back to the retracted position of FIG. 4 as the two guide members 58 and 60 also retract.

Figure 6:
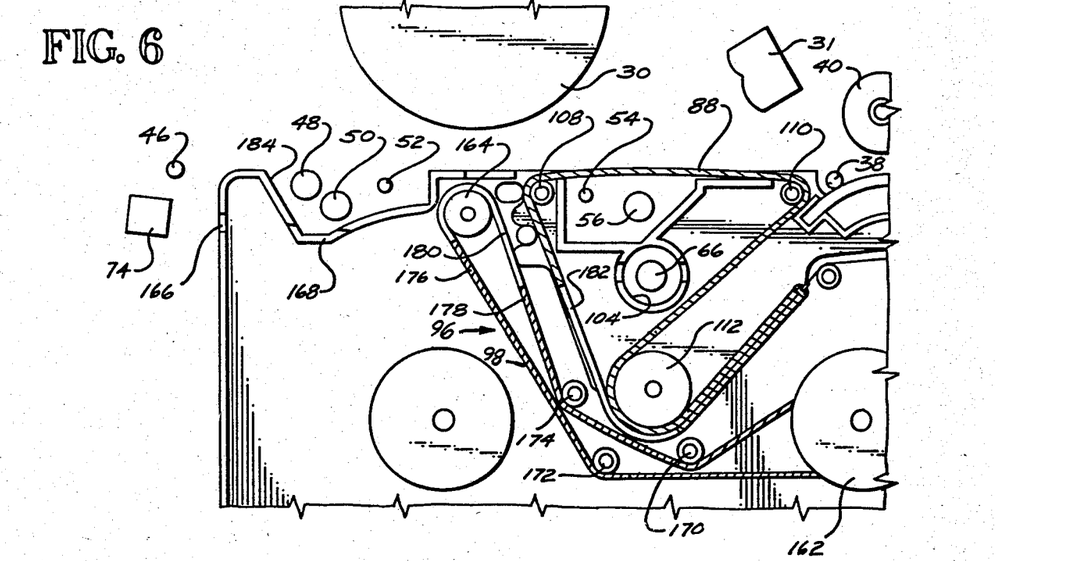
FIGS. 6, 7 and 8 are three views, similar to FIGS. 4 and 5, showing only a portion of the cleaning device, and specifically showing the shut-off mechanism of the present invention in three different operating positions.
Figure 7:
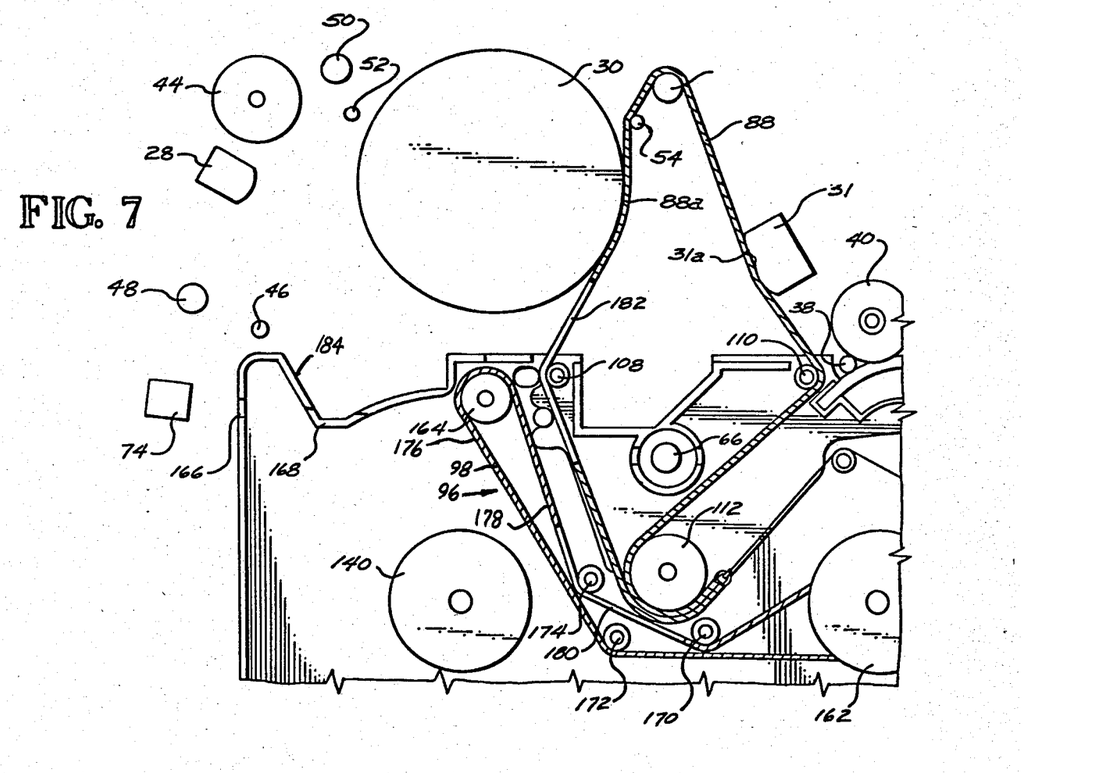
Figure 8:
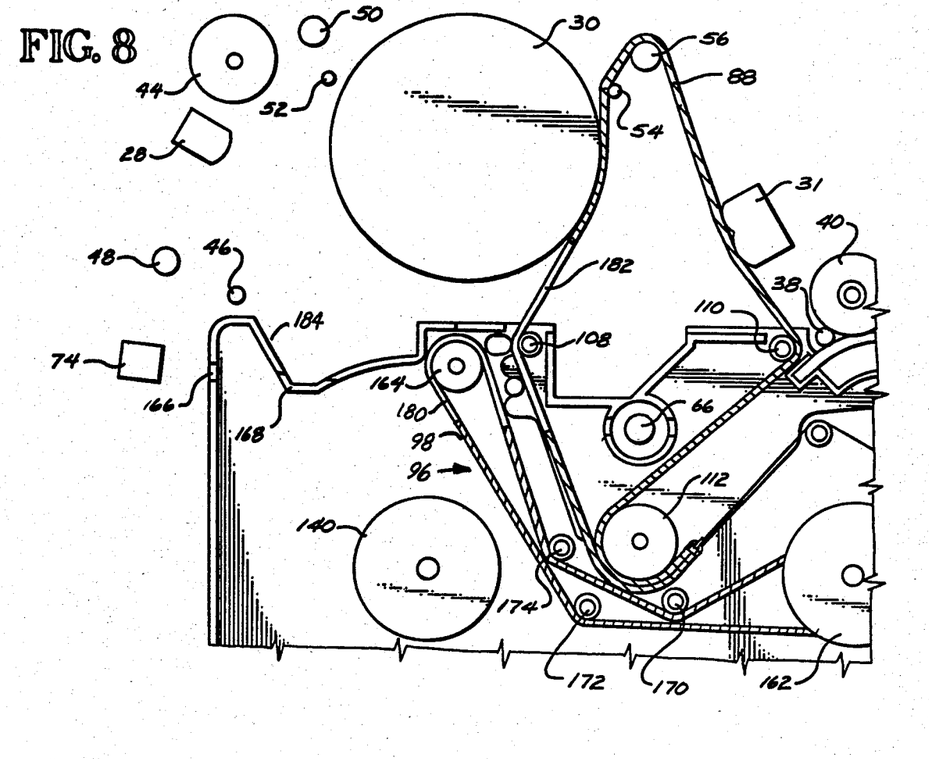

To proceed now to a detailed description of the shut-off device 96, reference is now made to FIGS. 6 through 8. The aforementioned shut-off ribbon 98 is formed in a closed loop, one end of which fits around a spool 162 splined to the right sprocket 62, with the other end of the loop extending around a roller 164. This roller 164 is positioned near the forward left portion of the case 82 to the left of the opening 104 that accommodates the light 66. At the left side of the case 82, there is a through opening 166 that is aligned with the light 66 and the left photocell 74. Also, a portion of the case 82 adjacent the opening 166 is cut away, as at 168, so as not to be positioned between the line from the light 66 through the opening 166 to the photocell 74.

The middle portions of the shut-off ribbon 98 are positioned against three guide rollers 170, 172 and 174, the purpose of these rollers 170–174 being to provide a proper path for the ribbon 98 around the location of the roller 112. It will be noted that the ribbon 98 travels a first path segment 176, leading up to the roller 164, and a second path segment 178 leading away from the roller 164. Both of these segments 176 and 178 are interposed between the light 66 and the left opening 166. One portion along the length of the ribbon 98 is formed with a longitudinally extending, elongate middle slot 180, this slot 180 being approximately one to two inches in length. When the ribbon 98 is precisely positioned so that the slot 180 is positioned as shown in FIG. 8, the light 66 is able to shine through the slot 180 to activate the photcell 74. In all other positions, one or both of the ribbon paths 176 and 178 are interposed between the light 66 and the photocell 74 to prevent activation of the cell 74.

To describe the operation of the shut-off device 96, let it be assumed that the shut-off ribbon 98 is in the position shown in FIG. 6. (As will be disclosed hereinafter, the position of the ribbon 98 shown in FIG. 6 is the position assumed when the device completes a cleaning cycle.) When the cleaning device 80 is placed in position and beings operation, the right sprocket 62 begins rotating to cause clockwise rotation of the shut-off ribbon 98. The slotted portion of the ribbon 98 is shown moving downwardly and to the right toward the spool 162. At this location of the slot 180, the device is approximately one-quarter or slightly more through its cleaning cycle. As the spool 162 continues to rotate, the slot 180 moves around the spool 162, and back towards the roller 164. As the slotted portion of the ribbon 98 moves around the roller 164, it reaches a position where the end portions of the slot 180 are in line with one another to provide an uninterrupted path between the light 66 and photocell 74. This position is indicated in FIG. 8. It will further be noted, with reference to FIG. 8, that the left portion of the cleaning ribbon 88 is formed with an elongate, longitudinally extending middle slot 182. When the cleaning ribbon 88 is in its extended cleaning position, the slot 182 is in alignment with the photocell 74 and the light 66, so that it does not interrupt the light path from the light 66 to the cell 74. Thus, at the moment of the shut-off ribbon 98 reaches the location shown in FIG. 8, the photocell 74 becomes activated to initiate certain actions in the video unit 10. As indicated previously, this stops rotation of the right spindle 62 and causes retraction of the various movable guide elements 46–56. Also, as indicated previously, this starts rotation of the left sprocket 64 in a counter-clockwise direction.

To describe the remaining features of the cleaning device 80, it will be noted that at the left forward portion of the case 82, there is a recess 184 similar to the recess 58 of the tape cassette 12 of FIGS. 1 and 2. This recess 184 is simply to accommodate the three movable guide elements 48, 50 and 52. Also, with reference to FIGS. 4 and 5, it will be noted that the case 82 is shown with a right opening 186 that is aligned with the right photocell 76. In this particular embodiment, the opening 186 has no function in the present invention, and exists simply because the particular prototype of the invention described herein utilized a case from a conventional tape cassette having this opening. However, this opening 186 may be used in the event that the unit 10 is shut off by a right photocell 76.

To summarize the complete operation of the present invention, let it be assumed that the cleaning device 80 is first placed in the receiving recess of the video unit 10, which as indicated previously is the recess which normally receives the tape cassette 12, previously described with reference to FIGS. 1 and 2. When the cleaning device 80 is placed in the unit 10, it is positioned as illustrated in FIG. 4. To initiate operation of the cleaning device 80, the start button of the unit 10 is pressed to place the unit 10 in either its play or recording mode. When this occurs, several things occur almost simultaneously. First, the four guide elements 46, 48, 50 and 52 move away from the case 82 to the positions shown in FIG. 5. This is simply the movement of these components which would occur in the playing of a conventional tape cassette, and have no significance in the present invention.

At the same time that the guide members 46–52 move outwardly, the two centrally positioned guide members 54 and 56 move from the position of FIG. 4 to the position shown in FIG. 5. As indicated previously, these components 54 and 56 engage the back side of the cleaning ribbon 88 and move the ribbon 88 forwardly. During initial outward movement of the tape 88, a right hand portion 88a of the tape 88 comes into engagement with the operating surface 31a of the audio head 31. As the two guide members 54 and 56 continue movement outwardly to the position of FIG. 5, the cleaning ribbon portion 88a wipes over the surface 31a to clean the same.

At the same time, the left hand portion 88b of the cleaning ribbon 88 comes into engagement with a short arcuate portion of the peripheral operating surface 32 of the video head 30. It will be noted that the left guide member 108 is so positioned relative to the location of the guide member 54 in the position of FIG. 5 that a straight line drawn between the members 108 and 54 extends beyond the surface portion 32 that is adjacent the ribbon portion 88b. Thus, the ribbon portion 88b is caused to engage the curved surface 32 along a moderate curve adjacent the path of travel of the surface 32. As was discussed previously herein, when the video unit 10 is operating, the video head 30 rotates at extremely high speeds. Since only moderate tension is applied to the anchor ends 114 of the cleaning ribbon 88, and since the ribbon 88 engages the surface 32 for only a short arcuate length, there is only a relatively small frictional force between the ribbon 88 and the surface 32. It has been found that it is possible to obtain sufficient engagement pressure of the ribbon 88 with the surface 32 to cause proper cleaning of the surface 32, without creating sufficient friction to either damage the scanning element or elements 34 or to cause any significant reduction of speed in the rotation of the video head 30.

With regard to the tension applied on the cleaning ribbon 88, it will be noted that the tension forces are provided by the two springs 144 and 156 acting against, respectively, the spring arms 130 and 136. The springs 144 and 156 are so selected that the tension is only moderate, so that the cleaning ribbon 88 can deflect around the video head 30 without exerting any great force thereon.

At the same time that the locating elements 46–56 move outwardly, and the video head 30 begins to rotate, the pinch roller 40 moves forward into engagement with the capstan 38. The cleaning pad 90 is initially positioned in the case 82 so that simply by placing the cleaning device 80 in operating position in the unit 10, the capstan 38 is already engaging the left portion of the pad 90. With the pinch roller 40 moving into engagement with the capstan 38, it also engages the pad 90. During operation of the unit 10, the capstan 38 and pinch roller 40 rotate, so that the surfaces of these two components that would normally engage the tape 16 now wipe against the pad 90 to cause a cleaning action.

At the same time as the components described above begin operation, the drive sprocket 62 begins to rotate clockwise. As indicated previously in the description of the operation of the shut-off device 96, this causes movement of the ribbon 98 from the position shown in FIG. 6, toward the position shown in FIG. 7. As the drive sprocket 62 continues to rotate, the sprocket 62 continues to cause the portion of the ribbon 98 having the slot 180 to move around the spool 162 and back towards the roller 164. As indicated previously, at such time that the slot 180 in the ribbon 98 reaches the position shown in FIG. 8, the light 66 has a clear path to the photocell 74 to activate the same. As described earlier herein, in the normal operation of the video unit 10 playing a tape cassette 16, the activation of the cell 74 sends a signal to the video unit 10 that the conventional tape 16 has reached its end path of travel, so that the unit 10 should stop playing the tape, and retract the tape so that it could be rewound on the left spool 18 that would exist in a normal tape cassette 14.

In the present invention, this particular feature is utilized quite advantageously, in that activation of the cell 74 first causes retraction of the movable guide elements 54 and 56 to permit the tension ribbon 94 to retract the cleaning ribbon 88 to the position shown in FIG. 5. Also, the sprocket 64 beings to rotate counterclockwise to place additional tension on the ribbon 94 to insure that the cleaning ribbon 88 is fully retracted. The initial movement of the sprocket 64 is illustrated in FIG. 5. As the sprocket 64 continues to rotate, it pulls the ribbon 88 to the fully retracted position shown in FIG. 4. At that time, there is sufficient tension on the ribbon 94 so that it resists further rotation of the sprocket 64. There is an automatic shut-off mechanism in the video unit 10, which operates in a manner that when the resisting force of rotation on the sprocket 64 reaches a predetermined level, the unit automatically shuts off. When this happens, the cleaning cycle is completed, and the cleaning device 80 can be taken from the unit 10.

Figure 11:
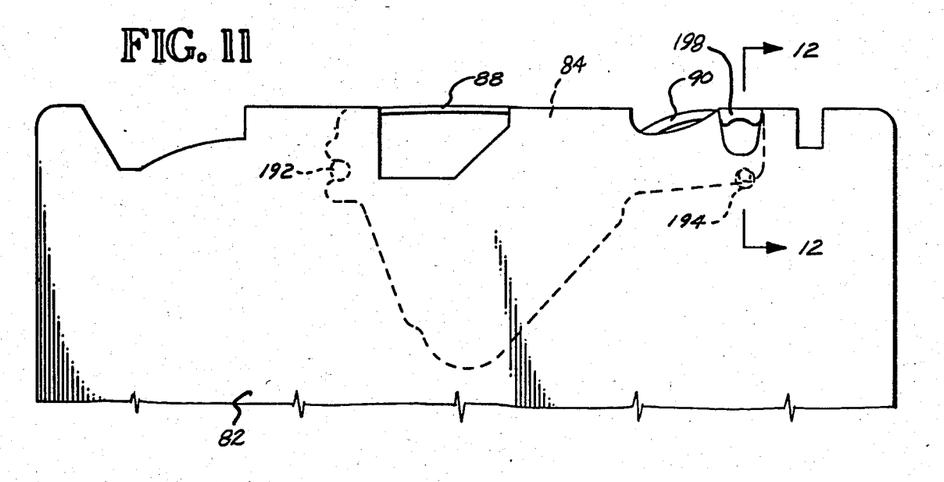
Figure 12:
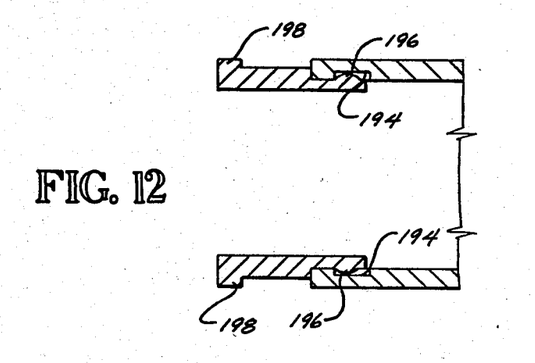
FIG. 12 is a sectional view taken along line 12—12 of FIG. 11.

As indicated previously, the cleaning cartridge 84 is made as a unit which can be removed from the case 82. This is so that the cleaning ribbon 88 and pad 90 can conveniently be replaced periodically. With reference to FIG. 9, the cartridge 84 is shown removed from the case 82. Let it be assumed a new cleaning ribbon 88 and pad 90 have been inserted in the cartridge 84, and it is now desired to replace the cartridge. It will be noted that at the left portion of the cartridge 84, there is a small recess 190 which is adapted to engage a pin 192 mounted in the case 82 immediately to the left of the middle recess 106. The connecting loop 116 on the ribbon 88 is first connected to the hook 118 that is located on the end of the tension ribbon 94. Then, the cartridge 84 is moved to the position shown in FIG. 10, so that the recess 190 engages the pin 192. From the position of FIG. 10, the right side of the cartridge 84 is rotated rearwardly to the position of FIG. 11. The inner surfaces of the top and bottom walls of the case 82 are formed with quite small recesses 194, and the right side of the cartridge 84 has the upper and lower surfaces formed with matching dimples 196. When the cartridge 84 is snapped into place, the dimples 196 become positioned in the recesses 194.

The right forward portion of the cartridge 84 is formed with upper and lower gripping members 198. To remove the cartridge 84 from the case 82, the person manually grasps the members 198 between the thumb and forefinger, presses moderately inwardly to move the dimples 196 out of engagement with the recesses 194, and pulls forwardly. This moves the cartridge back out to the position of FIG. 10, after which the cartridge 84 can be totally removed from the case 82.

The cleaning ribbon 88 and pad 90 are made of an absorbent material, so that these can receive a cleaning liquid. Also with regard to the shut off ribbon 98, normally the momentum of the drive components of the sprocket 62 rotate the sprocket 62 a short distance after the power to drive the sprocket 62 is interrupted. This carries the slot 180 of the tape 98 beyond the location of the opening 166 to the location of FIG. 6. If this does not occur the tape 98 can be advanced manually or by turning on the "fast wind" button on the machine 10 a number of times.

What is claimed is:

1. A cleaning apparatus for a playing and/or recording machine, where said machine has:
   a. a structure defining a recess to receive a tape cassette, said recess having a forward portion to receive a front side of said cassette, and a rear portion to receive a rear side of said cassette;
   b. a rotating head member having a curved peripheral surface;
   c. a plurality of guide members movable between a nonoperating position and an operating position, said guide members arranged so that with a tape cassette in the recess, the guide members in moving from the nonoperating to the operating position engage a tape portion positioned along the front side of the cassette and move the tape portion outwardly from the cassette into an operating position extending in a curved path along the peripheral surface of the head;

said apparatus comprising:
   a. a case having a front side and a back side, and adapted to be positioned in the recess of the machine;
   b. a cleaning ribbon mounted in said case and having a first retracted pre-cleaning position and a second extended cleaning position, said ribbon having a first forward portion which, in the first retracted position, extends at least partly along the front side of the case in a position to be engaged by at least part of said guide members, and to be carried by said at least part of said guide members to said second position where a contact surface portion of said ribbon is in cleaning engagement in a curved configuration with a portion of the peripheral surface of the head, said ribbon also having a connecting portion;
   c. a tension and return means having an operative yielding connection between said connecting portion of the ribbon and the case, said tension and return means yielding to permit extraction of the ribbon from the case and acting on the ribbon when the ribbon is in the extended cleaning position, so that the tension and return means causes the ribbon to be in proper pressing engagement with the head during a cleaning cycle, and after said cleaning cycle to retract said ribbon to the first retracted position.

2. The apparatus as recited in claim 1, wherein said tension and return means comprises spring means to exert a predetermined tension force on the ribbon.

3. The apparatus as recited in claim 2, wherein said first portion of the ribbon extends only along a portion of said front side to the case so as to be engaged by only part of said guide members in a manner that the contact surface portion of the ribbon in cleaning engagement with the peripheral surface of the head engages a lesser arcuate length of said peripheral surface of the head than an arcuate distance along which a conventional magnetic tape would be located in its operating position in a curved path along the peripheral surface of the head.

4. The apparatus as recited in claim 3, wherein the first portion of the ribbon extends only along a middle portion of the front side of the case whereby with the case being positioned in the recess of the machine, only those guide members which are at the middle portion of the front side of the case engage the ribbon to move it to its second cleaning position.

5. The apparatus as recited in claim 4, wherein said ribbon has two additional ribbon portions extending from opposite ends of the first front ribbon portion rearwardly into said case and attaching to said connecting portion of the ribbon, said apparatus further comprising two guides mounted to said case at opposite ends of the first forward portion of the ribbon in said first position, with said two guides properly locating said first ribbon portion in its first position.

6. The apparatus as recited in claim 5, wherein said two additional ribbon portions extend around a roller positioned in said case, whereby with said first portion of the ribbon being moved outwardly from said case, said ribbon moves outwardly from said roller.

7. The apparatus as recited in claim 6, wherein said spring means is operatively connected to the connecting portion of said ribbon which in turn is connected to the two additional ribbon portions to exert a tension force along a lengthwise axis of said ribbon.

8. The apparatus as recited in claim 5, wherein said spring means is operatively connected to the connecting portion of said ribbon which in turn is connected to the two additional ribbon portions to exert a tension force along a lengthwise axis of said ribbon.

9. The apparatus as recited in claim 8, wherein said ribbon is arranged relative to the tension and return means so that with the ribbon in its second extended cleaning position, said ribbon is stationary relative to motion along said lengthwise axis of said ribbon.

10. The apparatus as recited in claim 1, wherein said ribbon is arranged relative to the tension and return means so that with the ribbon in its second extending cleaning position, said ribbon is stationary relative to motion along a lengthwise axis of said ribbon.

11. The apparatus as recited in claim 1, wherein said case comprises a main case portion and a removable cartridge portion that has an operating position where the cartridge portion is positioned in the main case portion, said cartridge portion having the ribbon mounted thereto, with said cartridge portion and the ribbon being together removable from the main case.

12. The apparatus as recited in claim 11, wherein the cartridge portion has a front side extending only along a portion of the front side of the case, and the first portion of the ribbon extends along the front portion of the cartridge portion, said ribbon having two additional ribbon portions extending from opposite ends of the first ribbon portion and then extending rearwardly into the case to said connecting portion of the ribbon, said ribbon being removably connected to the tension and return means.

13. The apparatus as recited in claim 1, wherein there is a shutoff member movable on a path between an operating position and a shutoff position, said shutoff member being operable separately from said cleaning ribbon and adapted to be operatively connected to a drive member of said playing and/or recording machine in a manner that movement of said drive member during operation of the machine causes said shutoff member to move from said operating position to said shutoff position during a cleaning cycle of said apparatus to shut off operation of said drive member and to cause said guide members to be retracted to the non-operating position.

14. The apparatus as recited in claim 13, wherein said shutoff member comprises endless belt means mounted to a rotatable member that is adapted to be operatively connected to the drive member of the machine, said belt means having a shutoff portion thereon, said belt means being movable on a closed path to move said shutoff portion to the shutoff position during operation of the apparatus.

15. The apparatus as recited in claim 14, wherein said belt means comprises a light transmitting portion and a light interrupting portion, said belt means being positioned to be movable relative to a light source of the machine to cause transmission and interruption of light from said source to shut off operation of the drive member.

16. The apparatus as recited in claim 15, wherein said ribbon has two additional ribbon portions extending from opposite sides of the first front ribbon portion and extending rearwardly in said case and then attaching to said connecting portion of the ribbon, at least one of said two additional ribbon portions having a light transmitting portion to enable said light source to be transmitted through the light transmitting portion of the belt means to cause transmission and interruption of the light from said source.

17. The apparatus as recited in claim 16, wherein the light transmitting portion of said ribbon comprises a slot formed in said ribbon.

18. The apparatus as recited in claim 14, wherein said belt means has a non-shut-off portion that is opaque and a shut-off portion that is non-opaque, said belt means being movable in an endless path so that said non-opaque shut-off portion moves relative to a light source in said shut-off position to permit transmission of light to shutoff operation of said drive member.

19. The apparatus as recited in claim 1, wherein said tension and return means comprises a tension ribbon connected to the connecting portion of the cleaning ribbon.

20. The apparatus as recited in claim 19, wherein said tension and return means comprises spring means operatively engaging said tension ribbon to exert a predetermined tension on said cleaning ribbon and to retract said cleaning ribbon after the cleaning cycle.

21. The apparatus as recited in claim 20, wherein said tension ribbon is also operatively connected to a rotatable member connected to a drive member of the machine to function also to retract said cleaning ribbon after the cleaning cycle.

22. The apparatus as recited in claim 21, wherein said tension and return means further comprises at least one pivotally mounted spring arm which engages said tension ribbon.

23. The apparatus as recited in claim 20, wherein said tension and return means further comprises at least one pivotally mounted spring arm which engages said tension ribbon.

24. A cleaning apparatus for a playing and/or recording machine, where said machine has:

a. a structure defining a recess to receive a tape cassette, said recess having a forward portion to receive a front side of said cassette, and a rear portion to receive a rear side of said cassette;
b. a rotating head member having a curved peripheral surface;
c. a plurality of guide members movable between a nonoperating position and an operating position, said guide members arranged so that with a tape cassette in the recess, the guide members in moving from the nonoperating to the operating position engage a tape portion positioned along the front side of the cassette and move the tape portion outwardly from the cassette into an operating position extending in a curved path along the peripheral surface of the head;

said apparatus comprising:
a. a case having a front side and a back side, and adapted to be positioned in the recess of the machine;
b. a cleaning ribbon mounted in said case and having a first retracted pre-cleaning position and a second extended cleaning position, said ribbon having a first forward portion which, in the first retracted position, extends at least partly along the front side of the case in a position to be engaged by at least part of said guide members, and to be carried by said at least part of said guide members to said second position where a contact surface portion of said ribbon is in cleaning engagement in a curved configuration with a portion of the peripheral surface of the head;
c. return means mounted in said case and arranged to move said ribbon from the second extended cleaning position back to the retracted pre-cleaning position at completion of a cleaning cycle;
d. a shutoff member movable on a path between an operating position and a shutoff position, said shutoff member being operable separately from said cleaning ribbon and adapted to be operatively connected to a drive member of said playing and/or recording machine in a manner that movement of said drive member during operation of the machine causes said shutoff member to move from said operating position to said shutoff position during a cleaning cycle of said apparatus to shut off operation of said drive member and to cause said guide members to be retracted to the non-operating position.

25. The apparatus as recited in claim 24, wherein said shutoff member comprises endless belt means mounted to a rotatable member that is adapted to be operatively connected to the drive member of the machine, said belt means having a shutoff portion thereon, said belt means being movable on a closed path to move said shutoff portion to the shutoff position during operation of the apparatus.

26. The apparatus as recited in claim 25, wherein said belt means comprises a light transmitting portion and a light interrupting portion, said belt means being positioned to be movable relative to a light source of the machine to cause transmission and interruption of light from said source to shut off operation of the drive member.

27. The apparatus as recited in claim 26, wherein said ribbon has two additional ribbon portions extending from opposite sides of the first front ribbon portion and extending rearwardly in said case and then attaching to said connecting portion of the ribbon, at least one of said two additional ribbon portions having a light transmitting portion to enable said light source to be transmitted through the light transmitting portion of the belt means to cause transmission and interruption of the light from said source.

28. The apparatus as recited in claim 27, wherein the light transmitting portion of said ribbon comprises a slot formed in said ribbon.

29. The apparatus as recited in claim 25, wherein said shutoff member has a non-shut-off portion that is opaque and a shutoff portion that is non-opaque, said shutoff member being movable in a path so that said non-opaque shut-off portion moves relative to a light source in said shut-off position to permit transmission of light to shut off operation of said drive member.

* * * * *